(12) United States Patent
Laroche

(10) Patent No.: US 7,826,800 B2
(45) Date of Patent: Nov. 2, 2010

(54) METHOD AND SYSTEM FOR DETERMINING A TIME DELAY BETWEEN TRANSMISSION AND RECEPTION OF AN RF SIGNAL IN A NOISY RF ENVIRONMENT USING PHASE DETECTION

(75) Inventor: Jean-Louis Laroche, Montréal (CA)

(73) Assignee: Orthosoft Inc., Montreal (CA)

( * ) Notice: Subject to any disclaimer, the term of this patent is extended or adjusted under 35 U.S.C. 154(b) by 559 days.

(21) Appl. No.: 11/945,641

(22) Filed: Nov. 27, 2007

(65) Prior Publication Data

US 2008/0125054 A1 May 29, 2008

Related U.S. Application Data

(60) Provisional application No. 60/867,266, filed on Nov. 27, 2006.

(51) Int. Cl.
H04B 17/00 (2006.01)
(52) U.S. Cl. ............... 455/67.16; 455/60; 455/67.11; 455/452.2; 455/42; 375/279; 375/283; 375/308; 375/329
(58) Field of Classification Search ............ 455/67.16, 455/452.2, 23, 42, 506, 67.11, 60; 375/279, 375/283, 308, 329, 331
See application file for complete search history.

(56) References Cited

U.S. PATENT DOCUMENTS

| | | | |
|---|---|---|---|
| 5,296,861 A | 3/1994 | Knight | |
| 5,486,830 A | 1/1996 | Axline, Jr. et al. | |
| 5,606,324 A | 2/1997 | Justice et al. | |
| 5,613,214 A * | 3/1997 | Shirasawa et al. | ............ 455/411 |
| 5,613,219 A | 3/1997 | Vogel et al. | |
| 5,661,490 A | 8/1997 | McEwan et al. | |
| 5,901,183 A | 5/1999 | Garin et al. | |
| 6,147,638 A | 11/2000 | Rohling et al. | |
| 6,272,189 B1 | 8/2001 | Garin et al. | |
| 6,292,684 B1 | 9/2001 | Du et al. | |
| 6,407,699 B1 | 6/2002 | Yang | |
| 6,597,935 B2 | 7/2003 | Prince et al. | |
| 6,686,871 B2 | 2/2004 | Rohling et al. | |
| 6,728,569 B2 | 4/2004 | Edelman | |
| 6,856,281 B2 | 2/2005 | Billington et al. | |
| 6,898,415 B2 * | 5/2005 | Berliner et al. | ............ 455/63.1 |

(Continued)

FOREIGN PATENT DOCUMENTS

EP 1303058 4/2003

(Continued)

*Primary Examiner*—Tuan A Pham
(74) *Attorney, Agent, or Firm*—Ogilvy Renault LLP

(57) ABSTRACT

The present application describes a method and system for determining a time delay between a transmission and a reception of an RF signal in a noisy environment. The method comprises: transmitting the RF signal; shifting a phase of the RF signal after a first time period of the transmitting of the RF signal, starting at a known transition time; receiving a received RF signal comprising a received phase shift corresponding to the shifting of the phase of the transmitted RF signal, the received phase shift occurring at a receive transition time equivalent to a sum of the time delay and the known transition time; determining the receive transition time by detecting a time corresponding to the received phase shift; and calculating the time delay using the receive transition time and the known transition time.

16 Claims, 7 Drawing Sheets

U.S. PATENT DOCUMENTS

| | | |
|---|---|---|
| 6,901,264 B2 * | 5/2005 | Myr .................. 455/456.5 |
| 7,024,331 B2 | 4/2006 | Jones et al. |
| 7,030,805 B2 | 4/2006 | Ormesher et al. |
| 7,152,608 B2 | 12/2006 | Hunter et al. |
| 2003/0019932 A1 | 1/2003 | Tsikos et al. |
| 2003/0034387 A1 | 2/2003 | Knowles et al. |
| 2003/0053513 A1 | 3/2003 | Vatan et al. |
| 2003/0080190 A1 | 5/2003 | Tsikos et al. |
| 2003/0094495 A1 | 5/2003 | Knowles et al. |
| 2005/0206555 A1 | 9/2005 | Bridgelall et al. |

FOREIGN PATENT DOCUMENTS

| | | |
|---|---|---|
| GB | 00890791 | 3/1962 |
| WO | WO-88/03274 | 5/1988 |
| WO | WO-98/28634 | 7/1998 |
| WO | WO-01/20552 | 3/2001 |
| WO | WO-2005/003681 | 1/2005 |
| WO | WO-2005/116681 | 12/2005 |

\* cited by examiner

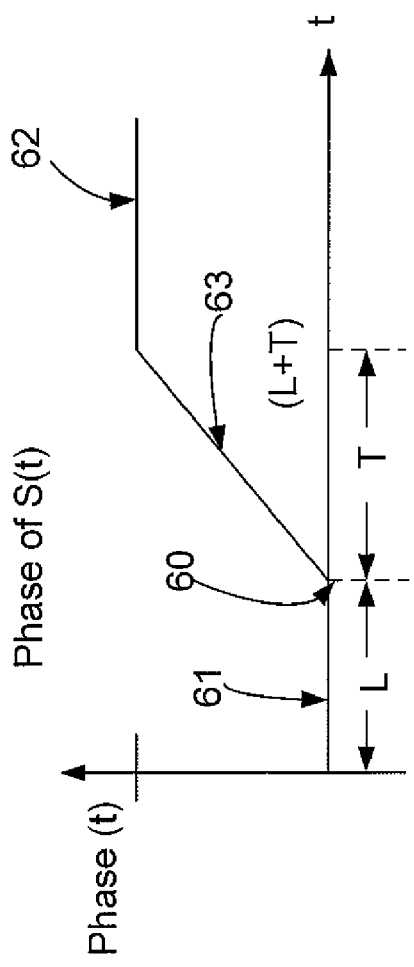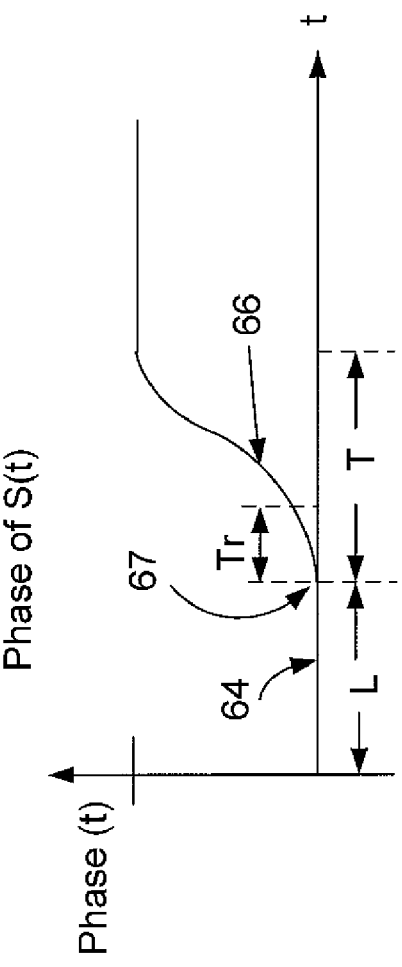

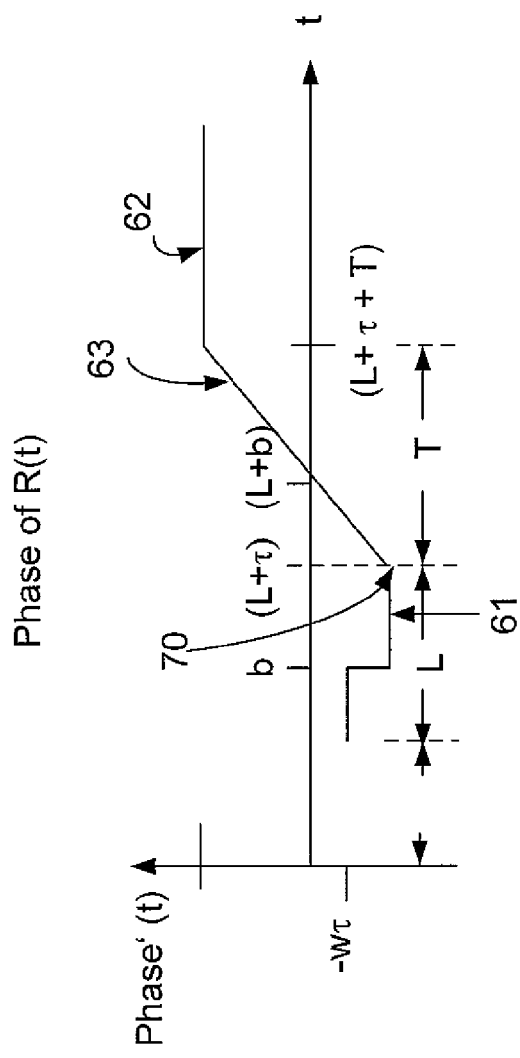
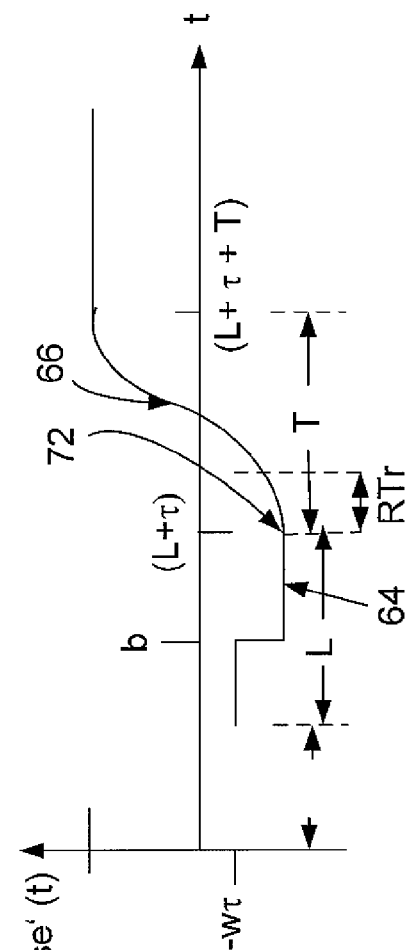
Fig. 5a
Fig. 5b

METHOD AND SYSTEM FOR DETERMINING A TIME DELAY BETWEEN TRANSMISSION AND RECEPTION OF AN RF SIGNAL IN A NOISY RF ENVIRONMENT USING PHASE DETECTION

CROSS-REFERENCE TO RELATED APPLICATIONS

This patent application claims priority under 35 U.S.C. 119 of the U.S. provisional Patent Application No. 60/867,266 entitled "METHOD FOR DETERMINING A TIME DELAY BETWEEN TRANSMISSION AND RECEPTION OF AN RF SIGNAL IN A NOISY RF ENVIRONMENT USING PHASE DETECTION" filed Nov. 27, 2006, which is hereby incorporated by reference.

FIELD OF THE APPLICATION

The present application relates to methods and devices for manipulation of RF signals in a noisy RF environment.

BACKGROUND OF THE ART

Various environmental conditions, limited resources and system requirements often lead to situations where a transmitted radio-frequency (RF) signal arrives distorted and almost undistinguishable at a receiver. It thus becomes quite desirable to be able to recuperate the useful transmitted signal from various distorting noise components in a received signal.

The ability to distinguish a signal for transmission from various distorting noise components in a received signal is useful for measuring time delays and associated displacements more accurately. A time delay indicative of a distance of a direct path from a transmitter to a receiver is inaccurate if it is based on measures taken from a signal experiencing one or more reflections along its path. Interference between the reflected signals can also cause discrepancies.

The greatest challenge in measuring accurate time delays between the transmission and the reception of a signal is to overcome multipath distortions such as signal reflections and diffraction. Multipath distortions can be caused by objects within the environment such as buildings, clouds, trees, and walls or objects within a closed area.

Since the growing potential of wireless solutions and a variety of other applications depend on enabling technologies such as time delay and distance measurement devices, efforts are herein directed to the recuperation of characteristics of an originally transmitted signal from a received, distorted signal comprising reflected signals and other noise components.

SUMMARY OF THE APPLICATION

It is therefore an aim of the present application to addresses issues associated with the prior art.

Therefore, in accordance with an embodiment, there is provided a method for determining a time delay between a transmission and a reception of an RF signal in a noisy environment. The method comprises: transmitting the RF signal; shifting a phase of the RF signal after a first time period of the transmitting of the RF signal, starting at a known transition time; receiving a received RF signal comprising a received phase shift corresponding to the shifting of the phase of the transmitted RF signal, the received phase shift occurring at a receive transition time equivalent to a sum of the time delay and the known transition time; determining the receive transition time by detecting a time corresponding to the received phase shift; and calculating the time delay using the receive transition time and the known transition time.

Further in accordance with another embodiment, there is also provided a system for determining a time delay between a transmission and a reception of an RF signal in a noisy environment. The system comprises: a signal transmitting device for transmitting the RF signal and for shifting a phase of the RF signal after a first time period of transmitting the RF signal, starting at a known transition time; a signal receiving device for receiving a received RF signal comprising a received phase shift corresponding to the shifting of the phase of the transmitted RF signal, the received phase shift occurring at a receive transition time equivalent to a sum of the time delay and the known transition time; and a processing device coupled to the signal receiving device, the processing device comprising a memory encoded with processing instructions for allowing the processing device to: determine the receive transition time by detecting a time corresponding to the received phase shift; and calculate the time delay using the receive transition time and the known transition time.

Further in accordance with yet another embodiment, there is also provided a computer-readable medium encoded with processing instructions for implementing a method, performed by a processing device, the method for determining a time delay between a transmission and a reception of an RF signal in a noisy environment. The method comprises: sending instructions to a transmitting device to start transmitting the RF signal; sending instructions to a signal phase shifting device to start shifting a phase of the RF signal after a first time period of transmission of the RF signal, starting at a known transition time; receiving from a receiving device, a received RF signal comprising a received phase shift corresponding to the shifting of the phase of the transmitted RF signal, the received phase shift occurring at a receive transition time equivalent to a sum of the time delay and the known transition time; determining the receive transition time by detecting a time corresponding to the received phase shift; and calculating the time delay using the receive transition time and the known transition time.

Further in accordance with still another embodiment, there is also provided an apparatus for determining a time delay between a transmission and a reception of an RF signal in a noisy environment. The apparatus comprises a processing device; a memory device accessible by the processing device; and an application coupled to the processing device. The application is configured for: sending instructions to a transmitting device to start transmitting the RF signal; sending instructions to a signal phase shifting device to start shifting a phase of the RF signal after a first time period of transmission of the RF signal, starting at a known transition time; receiving from a receiving device, a received RF signal comprising a received phase shift corresponding to the shifting of the phase of the transmitted RF signal, the received phase shift occurring at a receive transition time equivalent to a sum of the time delay and the known transition time; determining the receive transition time by detecting a time corresponding to the received phase shift; and calculating the time delay using the receive transition time and the known transition time.

BRIEF DESCRIPTION OF THE DRAWINGS

FIG. 4a is a graph illustrating an example of a phase versus time behavior of a signal for transmission according to the method of FIG. 3;

FIG. 4b is a graph illustrating another example of a phase versus time behavior of a signal for transmission according to the method of FIG. 3;

FIG. 5a is a graph illustrating an example of a phase versus time behavior of a received signal associated with the signal for transmission of FIG. 4a;

FIG. 5b is a graph illustrating an example of a phase versus time behavior of a received signal associated with the signal for transmission of FIG. 4b;

DESCRIPTION OF THE EMBODIMENTS

Figure 1:
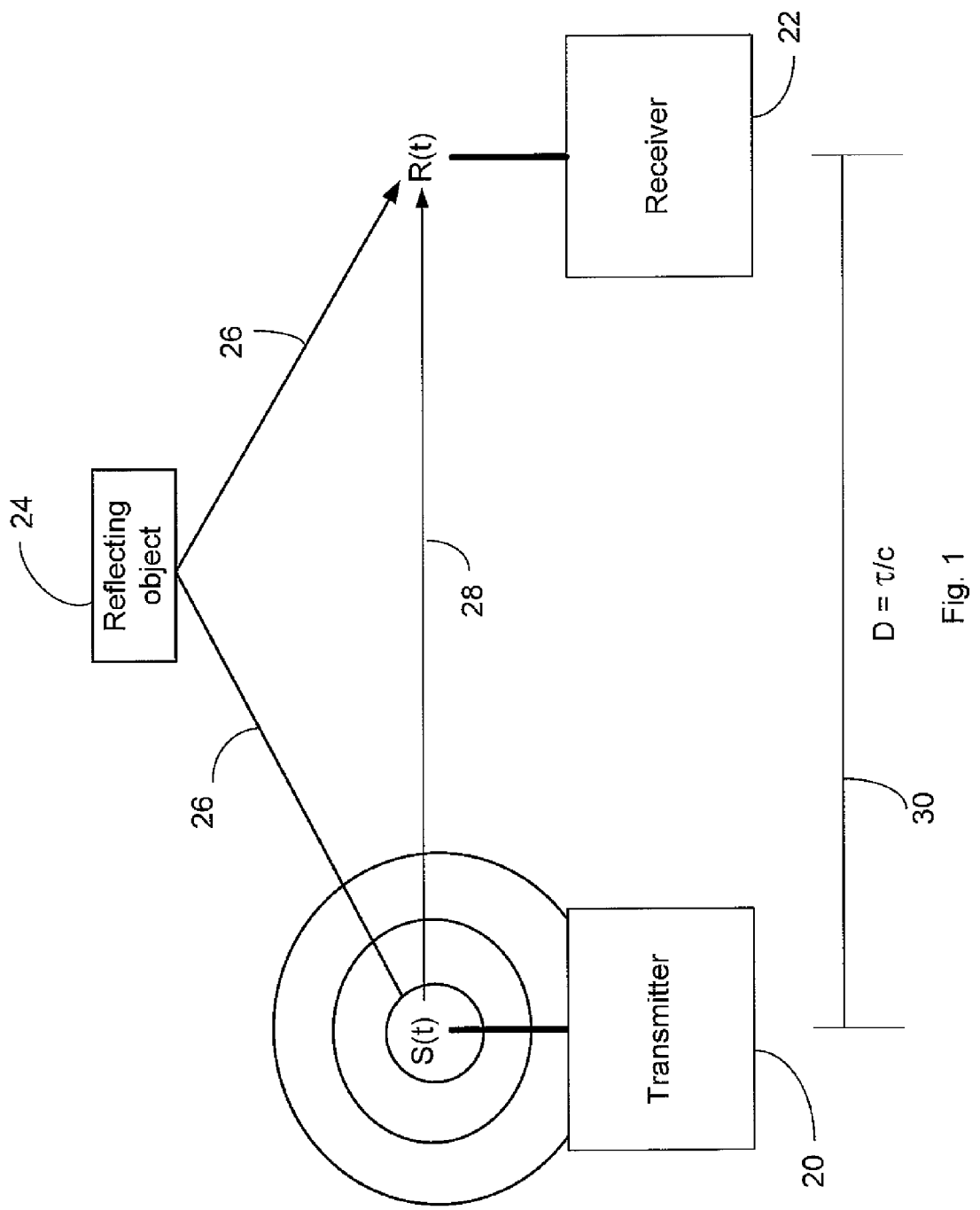
FIG. 1 is a schematic view of a transmission and a reception of an RF signal in an environment characterized by multipath distortions in accordance with an embodiment.

FIG. 1 illustrates the transmission and the reception of an RF signal in an environment wherein multipath distortions occur.

The transmitted signal S(t) is transmitted from a transmitter 20 (also referred to as a transmitting device). The receiver 22 (also referred to as a receiving device) receives signal R(t), which comprises the transmitted signal S(t) along with any noise and distortions N(t) component.

An example of one type of distortion is a reflection signal caused by an object 24 reflecting the signal S(t) transmitted from transmitter 20, thereby creating a distorted transmission path 26.

The transmission path 26 is thus a distortion of the direct path 28. Direct path 28 corresponds to the shortest distance 30 between transmitter 20 and receiver 22. The undistorted time delay associated with the RF signal traveling along direct path 28 is the time delay ($\tau$) between transmission and reception of the RF signal. Similarly, the shortest distance 30 is equal to the time delay ($\tau$) divided by the travel speed of the signal, which is usually set as the speed of light. It is understood that the travel speed of the signal can vary depending on the particular environment in which the signal travels.

In order to determine the time delay ($\tau$) associated with the transmission of the RF signal S(t) along direct path 28 until its reception at the end of the path 28, the transmitted signal S(t), delayed in time by an amount associated to the time delay ($\tau$), is distinguished amongst all of the signal components forming part of the received signal R(t), such as reflection signals and other distortions together referred to as N(t).

Figure 2:
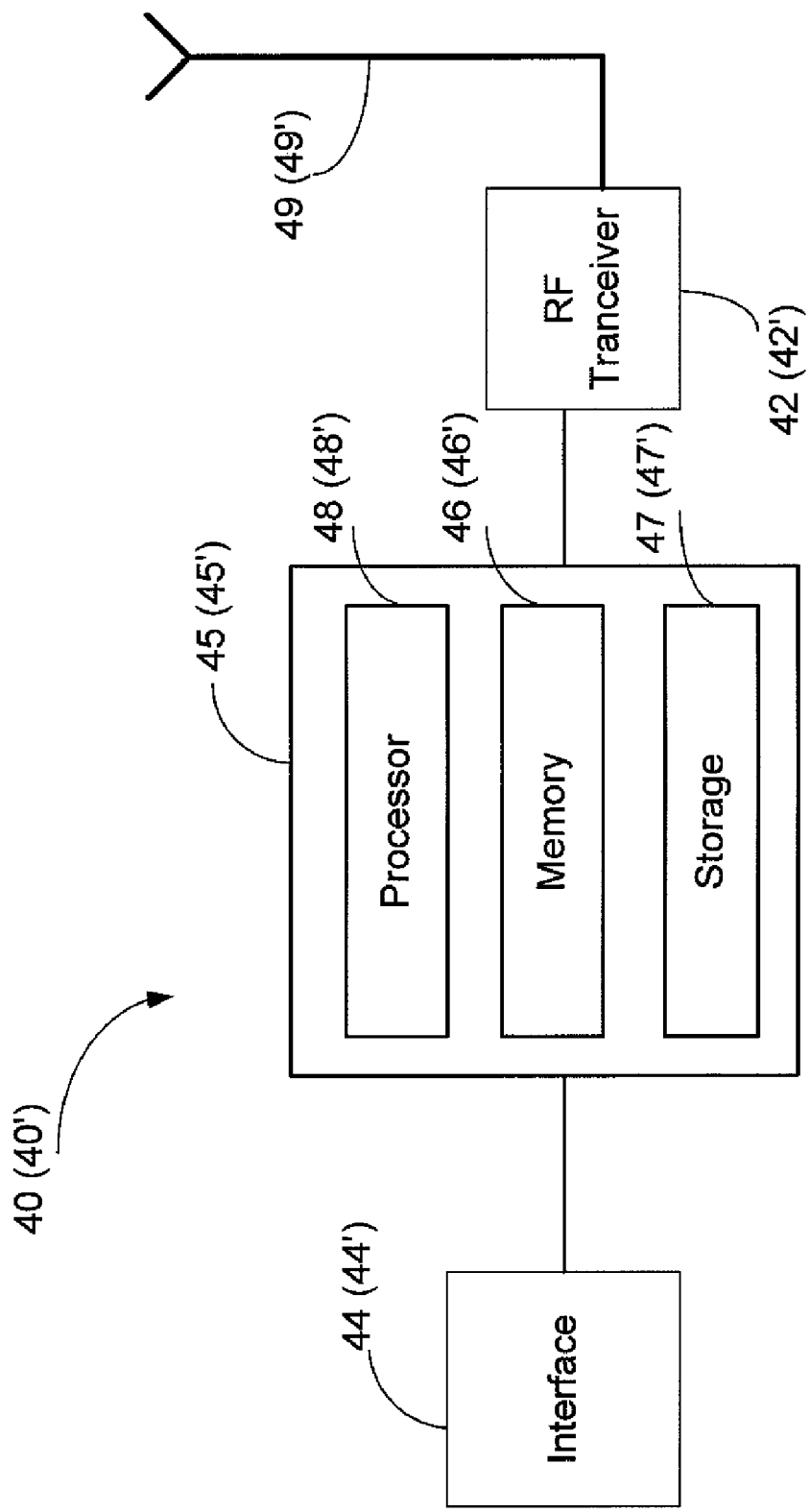
FIG. 2 is a schematic view of a system for determining a time delay between transmission and reception of an RF signal in accordance with an embodiment.

FIG. 2 illustrates a system 40 for determining a time delay ($\tau$) between transmission and reception of an RF signal using an RF transceiver 42 which can be employed as a transmitting device and/or a receiving device.

The system 40 comprises at least one transceiver 42, an interface 44, and an analysis unit 45 for generating a signal S(t) for transmission and providing instructions to the transceiver 42 to transmit S(t); or for analyzing a signal R(t) received by the transceiver 42.

The analysis unit 45 has a memory device 46, another optional storing device 47 and a processing device 48 (also referred to as a processor).

Figure 7:
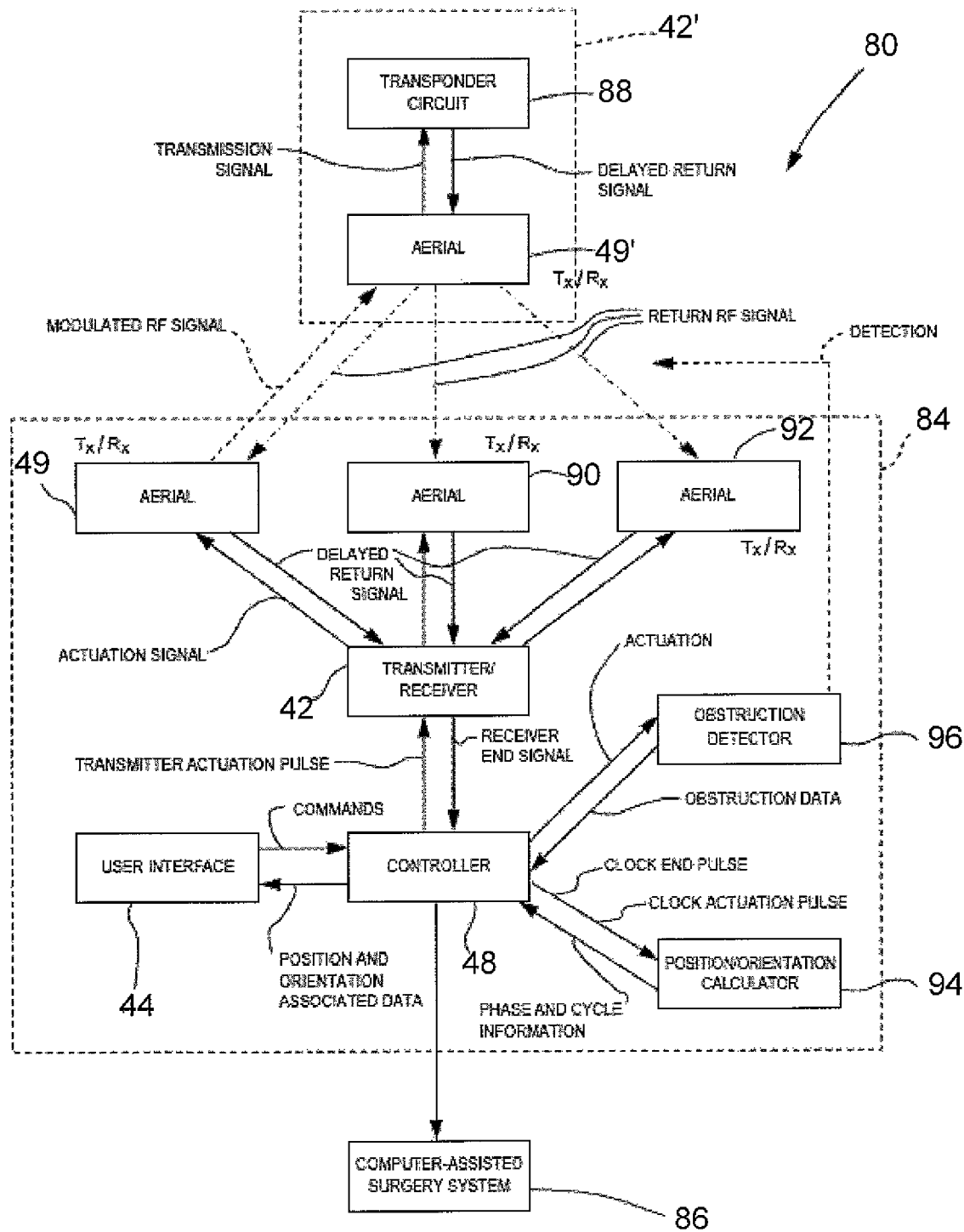
FIG. 7 is a schematic view of an example of an apparatus wherein the system of FIG. 2 and the method of FIG. 3 are applicable.

Transceiver 42 has an antenna 49, or optionally multiple antennas (also referred to as aerials) as better illustrated in FIG. 7.

The processing device 48 is in communication with the transceiver 42, the interface 44, the memory device 46 and the optional storing device 47.

The user interface 44 allows the input of data, by a user or by an external application (not shown), to the system 40. The user interface 44 also allows for the output of data to an external application or to the user, by display or any other form of output.

The memory 46 is encoded with the necessary instructions for allowing the processing device 48 to determine the time delay ($\tau$) according to the method described hereinafter.

The storing device 47 has a database for storing all relevant characteristics of the received signal R(t) such as phase and frequency versus time responses, along with any relevant phase or frequency diagrams. The storing device 47 can also store characteristics of the phase pattern of the transmitted signal S(t).

The user interface 44, the processing device 48, the memory device 46 and the storing device 47 are optionally embodied in the analysis unit 45, in communication with the transceiver 42. However, each of the components of the analysis unit 45 can be separate and remote from each other. The transceiver 42 can also be located remotely from the analysis unit 45 or from any one of its independent components 46, 47 and 48.

Additional processing devices are optionally used, within system 40, or remotely from system 40, to provide for added processing power as necessary for executing at least parts of the instructions for allowing the processing devices to function together in determining the time delay ($\tau$).

According to an embodiment, to determine a time delay ($\tau$) between the transmission and reception of an RF signal, system 40 and another same system 40' can be used. For example, signal S(t) is first transmitted by the transceiver 42 according to the processing device's 48 instructions. The other system 40' having its own analysis unit 45' and interface 44', receives signal R(t) at its transceiver 42'.

If a transmit-and-return time delay is to be determined, then one analysis unit 45 can be used in combination with one or two transceivers, 42 and 42'. For example, the system 40 can have another transceiver 42' which communicates with the same analysis unit 45 and interface 44 as the transceiver 42.

Figure 3:
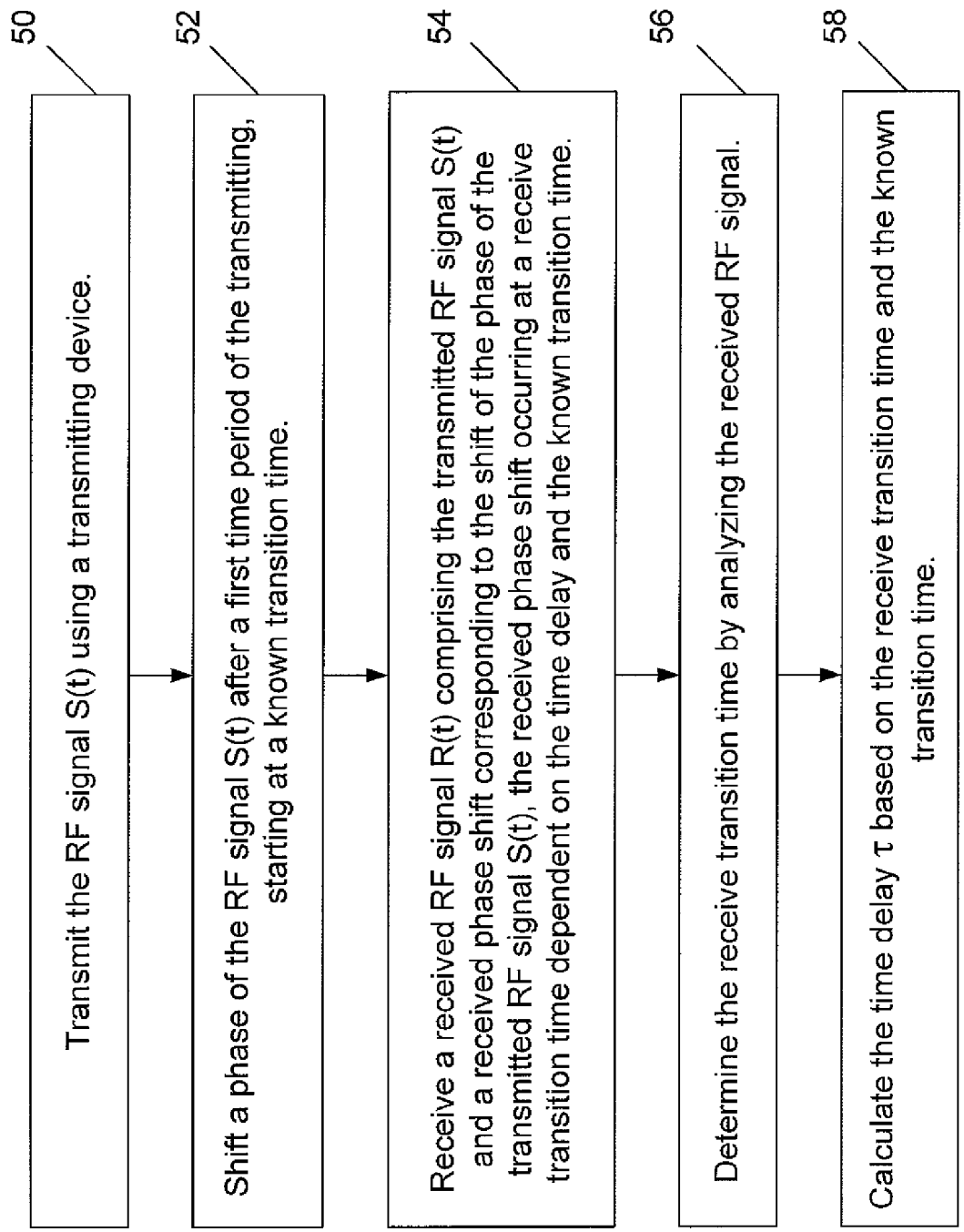
FIG. 3 is a block diagram illustrating a method for determining a time delay between transmission and reception of an RF signal in accordance with an embodiment.

In any case, the systems 40 and 40' are configured to implement the method as illustrated in FIG. 3.

Now referring to FIG. 3, there is described a method for determining a time delay ($\tau$) between transmission and reception of an RF signal.

In step 50, the RF signal S(t) is transmitted using a transmitting device such as transmitter 20 or transceiver 42, and according the control of a processing device following memory-resident instructions, the processing device being in communication with the transmitting device. The signal S(t) is transmitted according to a phase pattern, at a defined frequency and constant phase for a first given time period L.

The given frequency of transmission is chosen based on at least a permitted range of operating frequencies. The first given time period L is chosen to be longer than a turbulence time period b and larger than $0.35/(\frac{1}{2}BW)$, where BW is the bandwidth of one or more filters used to receive the signal R(t) in the receiving device's circuitry, in order to account for filter transient characteristics.

The turbulence period b referred to hereinabove is defined as the time after which all of the reflections are received at the receiving device, and hence after which their effect on the received signal is stable (given that the reflective environment is stable.

One example of a chosen frequency of transmission is within the range of about 915 MHz. For such a frequency, a possible first period L can be set to 50 nanoseconds.

In step 52, a phase of the RF signal S(t) is shifted during the transmitting of the RF signal S(t) in step 50. The shift can be any type of rise or decrease in the phase of the signal S(t). If the signal S(t) is to be generated according to the phase pattern, then the shifting can be instructed to a signal generating circuitry of the transmitting device ahead of actual transmission. In any case, a signal modulator, an interference device, a signal phase shifting device or any combination thereof can be used to perform such shifting, during or after initial generation of an RF signal for transmission.

As illustrated in FIG. 4a, the shifting is done after a first time period (L) of transmission of the RF signal S(t), starting at a known transition time 60.

The shifting of the phase of the RF signal S(t) is optionally performed by rising or decreasing the phase of the RF signal between a given start and stop time of shifting, as illustrated in FIG. 4a. In FIG. 4a, the phase is linearly changed by a first given amount from a first phase 61 to a second phase 62 over a second given time period T.

The given amount of phase change depends on the impulse response of the receiver's filters and can vary from 0° to 180° or even more. The second given period T can be the same or different from the first given period L, but it must meet the same requirements than L regarding the turbulence period b and the bandwidth of reception.

In FIG. 4a, the phase of S(t) starts to shift after a known time period L (or starting at the known transition time 60), and continues during a second time period T of transmitting the RF signal S(t), or until a stop time (L+T).

The known transition time 60 can also be viewed as a transition from one slope 61 to another slope 63 associated with the phase shift.

The shifting of step 52 is optionally performed by imposing a phase pattern, linear or not, on the RF signal S(t), as illustrated in FIG. 4b.

For example, in FIG. 4b, the phase pattern has a first time period L during which the phase varies according to a first slope 64, a second time period T during which the phase varies according to a second slope 66, and a transition (Tr) from the first to the second slope, the known transition time 67 defining one of a start of the transition (Tr), an end of the transition (Tr) and a known point within the transition (Tr).

Step 52 is also performed according to the control of the processing device, as in step 50. The processing device controls the transmitting device to transmit S(t) with the proper phase changes.

The given frequencies, phases and time periods L and T imposed on the signal S(t) are optionally entered by a user through an interface of the system for determining a time delay, an stored into a memory of the system.

Otherwise, the system determines a phase pattern to impose on signal S(t) based on pre-performed tests enabling a finding of a signal reflection turbulence period (b) and a known reception bandwidth.

Again referring to FIG. 3, in step 54, a received RF signal R(t) is received at a receiving device such as receiver 22 of transceiver 42. The transmitting device and the receiving device use the same clock. The time delay (τ) can therefore be determined at the receiving device if both devices each have their analysis unit 45.

The received RF signal R(t) has the transmitted RF signal S(t) and any reflection or noise signal N(t).

The signal R(t) also has a received phase shift corresponding to the phase shift of the transmitted RF signal S(t), and which is associated to the shifting performed in step 52.

The received phase shift occurs at a receive transition time which is dependent on the time delay (τ) and the known transition time of shifting (60 or 67 as in FIG. 4a and FIG. 4b) as performed in step 52. This receive transition time is equivalent to a sum of time periods defined by the time delay (τ) and the known transition time (60 or 67 as in FIG. 4a and FIG. 4b). By "equivalent", a skilled person in the art will understand that the receive transition time can be equal in best of cases, approximately equal and within a given acceptable error range of the sum, or dependent on the sum according to a known measurable degree. It should thus be understood that the time delay (τ) is calculated using at least the measured value of the receive transition time and the known value of the known transition time, and alternatively also based on other known values which need to be added to the sum.

Where the signal S(t) has a phase shift performed in step 52 as illustrated in FIG. 4a, the reception of the signal R(t) has a receive phase p' (t) as illustrated in FIG. 5a.

Referring to FIG. 5a, the signal R(t) has a receive phase pattern which starts after a time b of transmission; time b corresponds to the turbulence period. Note that there is no signal or phase received before the time delay (τ). Between the end of time delay (τ) and at least the expiration of the turbulence period b, the received signal is not useful due to the filter transient characteristics.

After time period b, the receive phase pattern follows the first slope 61 associated to the signal S(t) for a time (L−b) or until time equals (L+τ)−call this period A.

The phase then starts to shift at a receive transition time 70 corresponding to time (L+τ). From time (L+τ) to time (L+τ+T), the received phase linearly changes according to slope 63 and for a time period T or until the second slope 62 is reached. T is thus the second given period (also referred earlier as the period over which the phase of the transmitted signal S(t) is changed by a first given amount from a first phase to a second phase).

However, from time (L+τ) until time (L+b)−call this period B−, the phase of the received signal R(t) gradually starts to linearly change. During period B, from time (L+τ) to time (L+b), the received phase is turbulent due to the reflections present in the received signal R(t). From time (L+b) until time (L+τ+T)−call this period C−, the slope is stable. In one example where the amount of phase change from constant slope 61 to constant slope 63 is 180°, the phase change associated to slope 62 is π/T.

Where the signal S(t) has a phase shift performed in step 52 as illustrated in FIG. 4b, the signal R(t) optionally has a receive phase pattern which has a receive transition (RTr) between two slopes, the two slopes corresponding to the first slope 64 and the second slope 66 of the imposed phase pattern on S(t).

The receive transition (RTr) occurs at a receive transition time 72 approximately equal to the sum of the time delay (τ) and the known transition time 67 (in FIG. 4b) when the receive transition time 72 is set as the known transition time 67 (of FIG. 4b), that is the same as either one of a start of the transition (Tr and RTr), an end of the transition (Tr and RTr) and a known point within the transition (Tr and RTr).

Referring back to FIG. 3, in step 56, the receive transition time is determined by analyzing the received RF signal R(t).

To analyze the received signal R(t), a receive phase pattern of the signal R(t) is obtained and sampled by the processing device. Alternatively, a sampling device within or separate from the processing device can be used.

The sampled R(t) is then analyzed to determine and extract the receive transition time (70 or 72 of FIGS. 5a and 5b) which corresponds to the known transition time between a similar phase change of the transmitted signal S(t).

A phase diagram as illustrated in FIG. 5a and FIG. 5b is also optionally constructed based on the sampled receive phase pattern and optionally on the transmitted phase pattern.

The phase versus time behavior of the transmitted signal S(t), as well as the phase behavior of the received signal R(t), can both be described by mathematical equations in which time delay $\tau$ and/or turbulence period b are unknown variables.

The receive transition time is obtained using known values of L and T, which are either stored in a memory of the system, or recovered directly from the received phase pattern.

For example, the value of time for (L+$\tau$) (i.e. the receive transition time 70 of FIG. 5a; or the point at which period A ends and period B starts as described hereinabove) is determined using the known value for L.

Once way to obtain (L+$\tau$) is to perform a one-dimensional grid search using the equations for the phases of periods A and B referred to hereinabove in reference to FIG. 5a. The last known sample is first taken for period A (or slope 61 of FIG. 5a), that is, at time equals L+$\tau_0$, where L+$\tau \geq$L+$\tau_0$.

The value of L+$\tau_0$ is used to resolve the equations for periods A and B. For example, a value $\tau_1$ is chosen, such as $\tau_1 = \tau_0 + 1 \times 10^{-9}$ second (1 ns), and used to resolve the equations for periods A and B.

The value $\tau_1$ is then again incremented by $1 \times 10^{-9}$ second (1 ns) for example, and used to resolve the equations for periods A and B.

An appropriately small increment time is chosen to permit the execution of the method as described hereinabove. These last steps are repeated until it is certain that L+$\tau_x \geq$L+$\tau$, where x is the number of times the above iterative step is repeated. The L+$\tau_x$ which produces the smallest error in the resolution of equations for periods A and B is selected as the value of L+$\tau$ (hence L+$\tau$=L+$\tau_x$).

In step 58, once the value of (L+$\tau$), that is, the receive transition time, is determined, the time delay ($\tau$) is calculated.

The calculation is based on the determined receive transition time (70 or 72 of FIG. 5a and FIG. 5b) and the known transition time (60 or 67 of FIG. 4a and FIG. 4b), L for the first transition in FIG. 4a and FIG. 4b.

The calculation can involve the removal or subtraction of the known transition time (60 or 67 of FIG. 4a and FIG. 4b) from the receive transition time (respectively 70 or 72 of FIG. 5a and FIG. 5b)—or the subtraction of L form the value of (L+$\tau$) as determined in step 56. Such a subtraction can be performed by an adding or a subtracting circuit means, within or separate from the processing device.

The system can then output, optionally via an interface, to a user or to an external application, the determined time delay ($\tau$) and optionally, the distance D=$\tau$/c (c being the traveling speed of the signal). The output can also optionally be displayed on a screen, or outputted through speakers and the like. For example, an interface can display the characteristics of both the sent S(t) and received R(t) signals on screen for a user to view the phase diagrams of the signals.

Still referring to FIG. 3, in the above-described method, step 54 is optionally performed by using multiple aerials to receive the received RF signal R(t).

In such a case, step 56 of determining the receive transition time (70 or 72 of FIG. 5a and FIG. 5b) is performed using a known configuration of the aerials such as combining the RF signals received by each one of the aerials. Such combination is used to obtain points along a wavelength of the transmitted and received RF signals, such points being used in the determination performed in step 56.

Still according to the above-described method, in step 52, a pre-determined phase pattern or modulation can be imposed on the transmitted signal S(t), the pattern following a phase "key". As the system already has knowledge of the transmitted signal S(t) (i.e., the phase "key") at all times, only a few sampling points are measured from the receive phase pattern of the received signal R(t).

Figure 6:
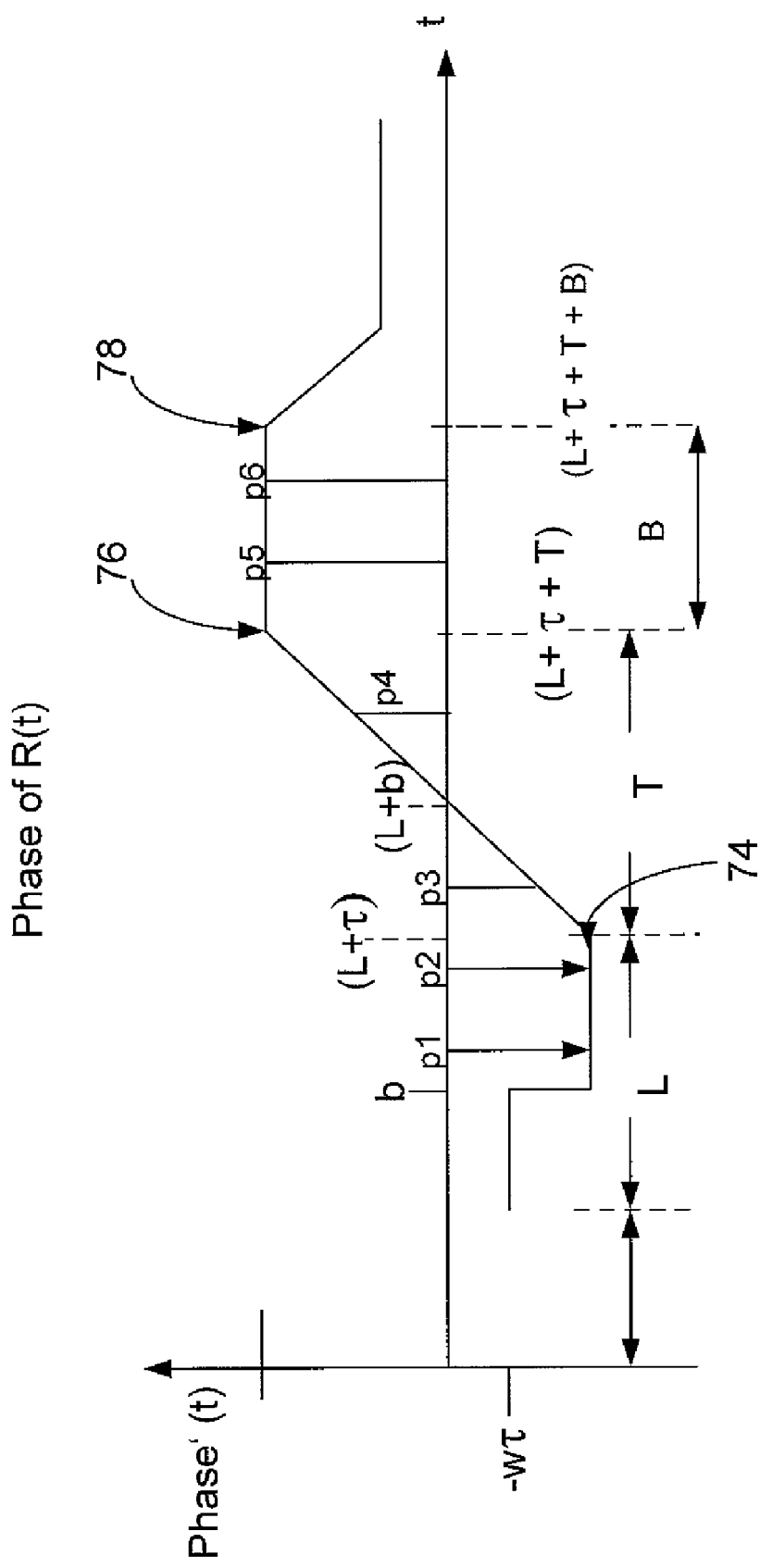
FIG. 6 is a graph illustrating yet another example of a phase versus time behavior of a received signal associated with a signal for transmission having multiple phase transitions.

For example, as illustrated in FIG. 6, pairs of sampling points p1, p2, p3, p4, p5 and p6 for each given time period L, T and B associated with a particular phase slope or phase amount, are respectively obtained. For each pair of sampling points located within a given period L, T or B, the slopes of the receive phase pattern corresponding to each time period L, T and B, are calculated using a slope identifying algorithm.

The phase "key" (phase pattern of the transmitted signal S(t)) is reconstructed using the slope information from the received signal R(t). Since the received signal R(t) contains the sum of the transmitted phase pattern and the effects of multiple reflected signals herein also referred to as noise, the knowledge of the initial phase pattern, i.e., the phase "key" is used to identify an amount of phase change due to such noise effects.

Once an amount of phase change is obtained, it may be subtracted from the reconstructed received phase pattern to produce a "corrected version" of the received phase pattern. The "corrected version" of the received phase pattern can then be compared to the transmitted phase "key" in order to more accurately find a time delay ($\tau$).

Alternatively, the knowledge of the initial phase pattern, i.e., the phase "key" is used to identify receive transition times 74, 76 an 78 between periods L, T and B and to compare them with known transition times of the " transmitted phase "key".

Now referring to FIG. 7, there is shown a block diagram illustrating a tracking system 80 for use in computer-assisted surgery. System 80 represents an example of a possible application of an embodiment of the system 40 of FIG. 2 and related method of FIG. 3, as described hereinabove. FIG. 7 shows reference numerals similar to those used in describing FIG. 2 hereinabove for components which correspond to one another.

The tracking system 80 has a transponder device 42' (displaceable, with its independent power source) and a tracking station 84 (fixed). The tracking station 84 is optionally connected to a computer-assisted surgery system 86, or to another system requiring position and orientation data that will be produced by the tracking station 84.

The transponder device 42' is connectable to a tool or to another object (not shown) to be tracked in space for position and orientation.

The interrelation between the transponder device 42' and the object to be tracked is known (e.g., through calibration) such that a tracking of the transponder device 42' will enable the tracking station 84 to obtain position and/or orientation information pertaining to the object (e.g., tip of a tool).

The transponder device 42' has an aerial or antenna 49' connected to a transponder circuit 88. The aerial 49' is provided to receive incoming RF signals, and to emit response signals as a function of the incoming RF signals, as directed by the transponder circuit 88.

The tracking station 84 has a controller 48. The controller 48 is a processing unit (e.g., micro-controller, computer or the like) that controls the operation of the tracking station 84. The controller 48 is connected to a user interface 44, by which an operator may command the tracking system 80.

The controller 48 transmits position and/or orientation associated data to the user interface 44 as output from the tracking system 80.

Still referring to FIG. 7, the controller 48 is also connected to a transmitter/receiver or transceiver 42. The transmitter/receiver 42 is provided for emitting modulated RF signals through at least aerials 49, 90 and 92.

The transmitter/receiver 42 is also provided for receiving a return RF signal from the transponder device 42' using the aerials.

A position/orientation calculator 94 is connected to the controller 48. The position/orientation calculator 92 is typically a software or a drive associated with the controller 48 for implementing the method described hereinabove, and by which position and/or orientation pertaining to the transponder device 42' is determined.

For instance, an actuation pulse is sent to the position/orientation calculator 94. Phase measurement is considered by a phase comparator in the position/orientation calculator 96. Once a time delay ($\tau$) between transmission and reception of the RF signal at the transceiver 42 of the tracking station 84 is determined, the distance between the transponder device 42' and the tracking station 84 is calculated as half the value of the distance D corresponding to the time delay ($\tau$).

If orientation information is required, the object is equipped with either three of the transponder device 42' placed in a non-linear or orthogonal arrangement, or with one transponder device 42' having also at least three orthogonally oriented aerials 49' connected to the transponder circuit 86 via RF switches for example.

An optional obstruction detector 96 is also connected to the controller 48. The obstruction detector 96 is also typically a software or a drive associated with the controller 48 for implementing the method as described hereinabove with reference to FIG. 6, whereby an amount of phase change due to the effects of obstructions and reflections is calculated, and a specific cause of distortion is identified using the knowledge of the initially transmitted phase pattern.

The embodiments of the inventions described above are intended to be exemplary only. The scope of the inventions is therefore intended to be limited solely by the scope of the appended claims.

The invention claimed is:

1. A method for determining a time delay between a transmission and a reception of an RF signal in a noisy environment, the method comprising:
   transmitting the RF signal;
   shifting a phase of the RF signal after a first time period of the transmitting of the RF signal, starting at a known transition time;
   receiving a received RF signal comprising a received phase shift corresponding to the shifting of the phase of the transmitted RF signal, the received phase shift occurring at a receive transition time equivalent to a sum of the time delay and the known transition time;
   determining the receive transition time by detecting a time corresponding to the received phase shift; and
   calculating the time delay using the receive transition time and the known transition time.

2. The method of claim 1, wherein the shifting comprises imposing a phase pattern on the RF signal, the phase pattern comprising a first time period during which the phase varies according to a first slope, a second time period during which the phase varies according to a second slope, and a transition from the first to the second slope, the known transition time defining one of a start of the transition, an end of the transition and a known point within the transition.

3. The method of claim 2, wherein the receiving comprises receiving the received RF signal comprising the received phase pattern, the received phase pattern comprising a receive transition between two slopes, the two slopes corresponding to the first slope and the second slope of the imposed phase pattern, the receive transition occurring at a receive transition time equivalent to the sum of the time delay and the known transition time.

4. The method of claim 1, wherein the determining comprises sampling the received RF signal to obtain the receive phase pattern and using the receive phase pattern to determine the receive transition time.

5. The method of claim 1, wherein the calculating comprises subtracting the known transition time from the receive transition time.

6. The method of claim 1, wherein the shifting comprises at least one of rising and decreasing the phase of the RF signal after the first time period of transmitting the RF signal, starting at the known transition time and during a second time period of transmitting the RF signal.

7. The method of claim 1, wherein the receiving of the received RF signal comprises receiving the received RF signal at one or more aerial, and wherein the determining of the receive transition time comprises combining received RF signals as received by each one of the one or more aerial.

8. A system for determining a time delay between a transmission and a reception of an RF signal in a noisy environment, the system comprising:
   a signal transmitting device for transmitting the RF signal and for shifting a phase of the RF signal after a first time period of transmitting the RF signal, starting at a known transition time;
   a signal receiving device for receiving a received RF signal comprising a received phase shift corresponding to the shifting of the phase of the transmitted RF signal, the received phase shift occurring at a receive transition time equivalent to a sum of the time delay and the known transition time; and
   a processing device coupled to the signal receiving device, the processing device comprising a memory encoded with processing instructions for allowing the processing device to: determine the receive transition time by detecting a time corresponding to the received phase shift; and calculate the time delay using the receive transition time and the known transition time.

9. The system of claim 8, wherein the signal transmitting device comprises means for imposing a phase pattern on the RF signal, the phase pattern comprising a first time period during which the phase varies according to a first slope, a second time period during which the phase varies according to a second slope, and a transition from the first to the second slope, the known transition time defining one of a start of the transition, an end of the transition and a known point in the transition.

10. The system of claim 9, wherein the signal receiving device comprises a receiving device for receiving the received RF signal comprising the received phase pattern, the received phase pattern comprising a receive transition between two slopes, the two slopes corresponding to the first slope and the second slope of the imposed phase pattern, the receive transition occurring at a receive transition time equivalent to the sum of the time delay and the known transition time.

11. The system of claim 8, wherein the processing device comprises a sampling device for sampling the received RF signal to obtain the receive phase pattern and determine the receive transition time.

12. The system of claim 8, wherein the processing device comprises at least one of an adding and a subtracting circuit means for subtracting the known transition time from the receive transition time.

13. The system of claim 8, wherein the signal transmitting device comprises at least one of a signal modulator, an interference device and a signal phase shifting device.

14. The system of claim 8, wherein the signal transmitting device comprises means for at least one of rising and decreasing the phase of the RF signal after the first time period of transmitting the RF signal, starting at the known transition time and during a second time period of transmitting the RF signal.

15. The system of claim 8, wherein the signal receiving device comprises one or more aerials.

16. An apparatus for determining a time delay between a transmission and a reception of an RF signal in a noisy environment, the apparatus comprising:
- a processing device;
- a memory device accessible by the processing device; and
- an application coupled to the processing device, the application configured for:
    - sending instructions to a transmitting device to start transmitting the RF signal;
    - sending instructions to a signal phase shifting device to start shifting a phase of the RF signal after a first time period of transmission of the RF signal, starting at a known transition time;
    - receiving from a receiving device, a received RF signal comprising a received phase shift corresponding to the shifting of the phase of the transmitted RF signal, the received phase shift occurring at a receive transition time equivalent to a sum of the time delay and the known transition time;
    - determining the receive transition time by detecting a time corresponding to the received phase shift; and
    - calculating the time delay using the receive transition time and the known transition time.

* * * * *